United States Patent
Pawar et al.

(10) Patent No.: US 11,786,832 B2
(45) Date of Patent: Oct. 17, 2023

(54) THREE-DIMENSIONAL ANIMATRONIC EYE

(71) Applicants: Ekta Pawar, Atlanta, GA (US); Gaurav Kumar, Atlanta, GA (US)

(72) Inventors: Ekta Pawar, Atlanta, GA (US); Gaurav Kumar, Atlanta, GA (US)

(73) Assignee: Ekta Pawar, Atlanta, GA (US)

( * ) Notice: Subject to any disclaimer, the term of this patent is extended or adjusted under 35 U.S.C. 154(b) by 397 days.

(21) Appl. No.: 17/244,009

(22) Filed: Apr. 29, 2021

(65) Prior Publication Data
US 2022/0347588 A1    Nov. 3, 2022

(51) Int. Cl.
*A63H 3/40* (2006.01)
*H04N 23/51* (2023.01)

(52) U.S. Cl.
CPC ............. *A63H 3/40* (2013.01); *H04N 23/51* (2023.01)

(58) Field of Classification Search
CPC ............ A63H 3/38; A63H 3/40; A63H 3/42
See application file for complete search history.

(56) References Cited

U.S. PATENT DOCUMENTS

| | | | |
|---|---|---|---|
| 6,902,404 B2 | 6/2005 | Johnson, Jr. | |
| 8,210,917 B2 | 7/2012 | Sip et al. | |
| 8,303,368 B2* | 11/2012 | Li | A63H 3/40 446/343 |
| 8,715,033 B2* | 5/2014 | Smoot | A61F 2/141 446/131 |
| 9,776,097 B2 | 10/2017 | Smoot et al. | |
| 10,179,040 B2 | 1/2019 | Smoot et al. | |
| 10,363,192 B2 | 7/2019 | Casey | |
| 10,820,986 B2 | 11/2020 | Abramson et al. | |
| 11,138,907 B2* | 10/2021 | Kirchhoff | G09B 23/28 |
| 11,376,733 B2* | 7/2022 | Burgess | B25J 13/08 |
| 2016/0086517 A1 | 3/2016 | Gao et al. | |
| 2016/0193536 A1* | 7/2016 | Mansilla Gonzalez | A63H 3/001 446/392 |
| 2019/0381415 A1 | 12/2019 | McMullen et al. | |
| 2020/0206940 A1 | 7/2020 | Takada et al. | |

OTHER PUBLICATIONS

Ikkalebob; DIY Compact 3D Printed Animatronic Eye Mechanism; https://www.instructables.com/DIY-Compact-3D-Printed-Animatronic-Eye-Mechanism/.

* cited by examiner

*Primary Examiner* — John A Ricci
(74) *Attorney, Agent, or Firm* — Jason C. Cameron

(57) ABSTRACT

A 3D animatronic eye is disclosed for fashion products, comprising an eye base and an internal connecting rod mounted on the eye base. The internal connecting rod is placed centrally within the 3D animatronic eye. A lid motor engages to move the lid arm in a predefined angular range. An eye lid is mounted on the lid arm. The motion of the lid arm generates a blinking motion of the eye lid. A sclera is disposed comprising a pupil print. A horizontal motor engages with the sclera to move the sclera linearly in left or right direction. A vertical motor engages with the sclera to move the sclera linearly in upward or downward direction. A housing mounted on the eye base, covers the sclera. A control unit comprises executable program instructions to control the motion of the lid motor, the horizontal motor, and the vertical motor.

14 Claims, 12 Drawing Sheets

THREE-DIMENSIONAL ANIMATRONIC EYE

FIELD OF INVENTION

Embodiments of the present disclosure relate to an animatronic eye and more particularly to a three dimensional (3D) animatronic eye for fashion products.

BACKGROUND

Fashion trends are basis for designs of clothing and wearable accessories that are produced every season. Fashion is important in society because it has the potential to bring different people together to celebrate their own individuality.

There exist demands to wear or relate to things that are unique and does not exist anywhere else, as a fashion trend. Technological designs or innovations in the fashion industry may introduce new fashion trends. For example, there are dresses where shape of an eye has been used as a print, pattern, embroidery or as a stuffed eyepiece. Further, there exists arts where eye movement are introduced for fashion by applying complex design elements. The applications of such arts are highly limited. The eye designs with eye movements in existing arts are robotic, complex and expensive.

Hence, there is a need for an animatronic eye in order to address the aforementioned issues.

SUMMARY

This summary is provided to introduce a selection of concepts, in a simple manner, which is further described in the detailed description of the invention. This summary is neither intended to identify key or essential inventive concepts of the subject matter nor to determine the scope of the invention.

In accordance with a first embodiment of the present disclosure, a three dimensional (3D) animatronic eye is disclosed for fashion products. The 3D animatronic eye comprises an eye base and an internal connecting rod mounted on the eye base. The internal connecting rod is placed centrally within the 3D animatronic eye. A lid motor is mounted on the internal connecting rod and engages with a lid arm to move the lid arm in a predefined angular range. An eye lid is mounted on the lid arm. The motion of the lid arm generates a blinking motion of the eye lid.

A sclera is disposed comprising a pupil print. A horizontal motor is mounted on the internal connecting rod and engages with the sclera to move the sclera linearly in a left direction and a right direction. A vertical motor is mounted on the internal connecting rod and engages with the sclera to move the sclera linearly in an upward direction and a downward direction.

A housing is mounted on the eye base covering the sclera, comprising an eye shape opening. A control unit mounted on the eye base and electronically connected to the lid motor, the horizontal motor, and the vertical motor to control the motion of the lid motor, the horizontal motor, and the vertical motor. The control unit comprises one or more executable program instructions to control the motion of the lid motor, the horizontal motor, and the vertical motor.

Embodiments herein also disclose a system for fashion products. The system includes one or more fashion products. The system further includes one or more user devices communicatively coupled to a three-dimensional animatronic eye via a network. The system further includes the three-dimensional animatronic eye mounted on the one or more fashion products and communicatively coupled to the one or more user devices via the network. The three-dimensional animatronic eye includes an eye base and an internal connecting rod mounted on the eye base. The internal connecting rod is disposed centrally within the 3D animatronic eye. Further, the three-dimensional animatronic eye includes a lid motor mounted on the internal connecting rod and engaged with a lid arm to move the lid arm in a predefined angular range. Furthermore, the three-dimensional animatronic eye includes an eye lid mounted on the lid arm. The motion of the lid arm generates a blinking motion of the eye lid. Further, the three-dimensional animatronic eye includes a sclera comprising a pupil print and a horizontal motor mounted on the internal connecting rod and engaged with the sclera to move the sclera linearly in a left direction and a right direction. Also, the three-dimensional animatronic eye includes a vertical motor mounted on the internal connecting rod and engaged with the sclera to move the sclera linearly in an upward direction and a downward direction. Additionally, the three-dimensional animatronic eye includes a housing mounted on the eye base covering the sclera, comprising an eye shape opening. The three-dimensional animatronic eye includes a control unit mounted on the eye base and electronically connected to the lid motor, the horizontal motor, and the vertical motor to control the motion of the lid motor, the horizontal motor, and the vertical motor. The control unit comprises one or more executable program instructions to control the motion of the lid motor, the horizontal motor, and the vertical motor.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.

DETAILED DESCRIPTION OF THE INVENTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention. It will be understood by those skilled in the art that the foregoing general description and the following detailed description are exemplary and explanatory of the invention and are not intended to be restrictive thereof.

The terms "comprise", "comprising", or any other variations thereof, are intended to cover a non-exclusive inclusion, such that one or more devices or submodules or elements or structures or components preceded by "comprises . . . a" does not, without more constraints, preclude the existence of other devices, sub-systems, additional submodules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting. Embodiments of the present invention will be described below in detail with reference to the accompanying figures.

Figure 1A:
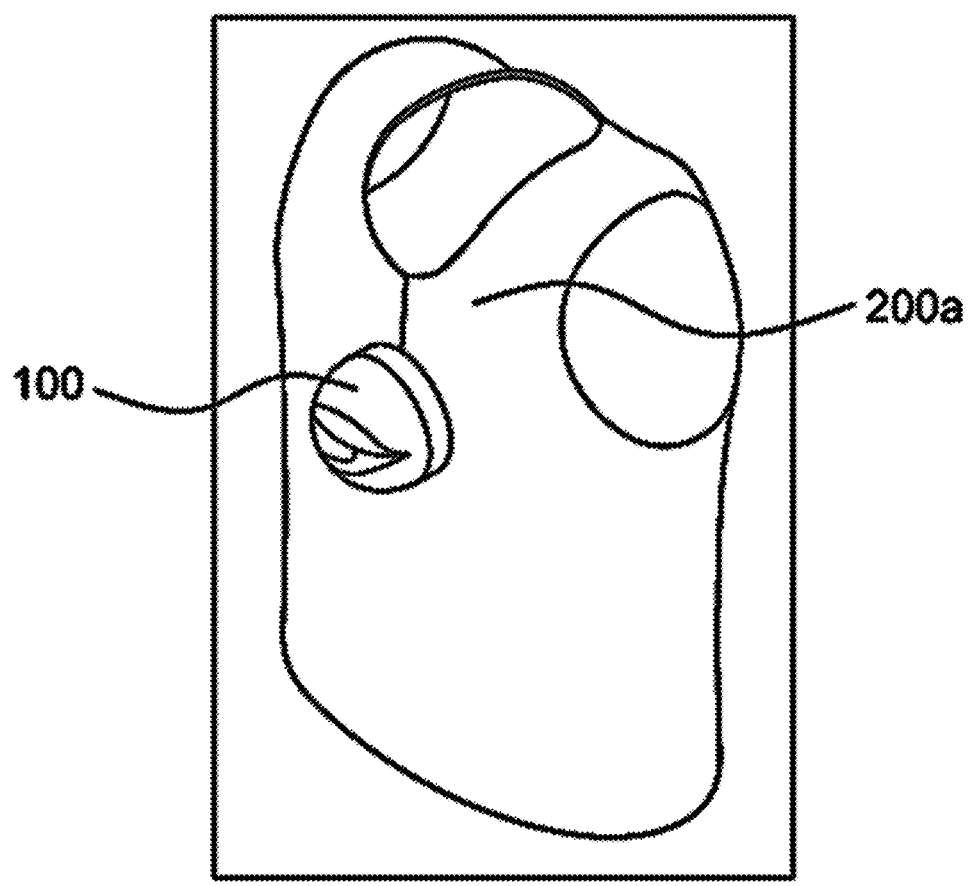
FIG. 1A-D illustrate various applications of exemplary three dimensional (3D) animatronic eye for fashion products, in accordance with an embodiment of the present disclosure.
Figure 1B:
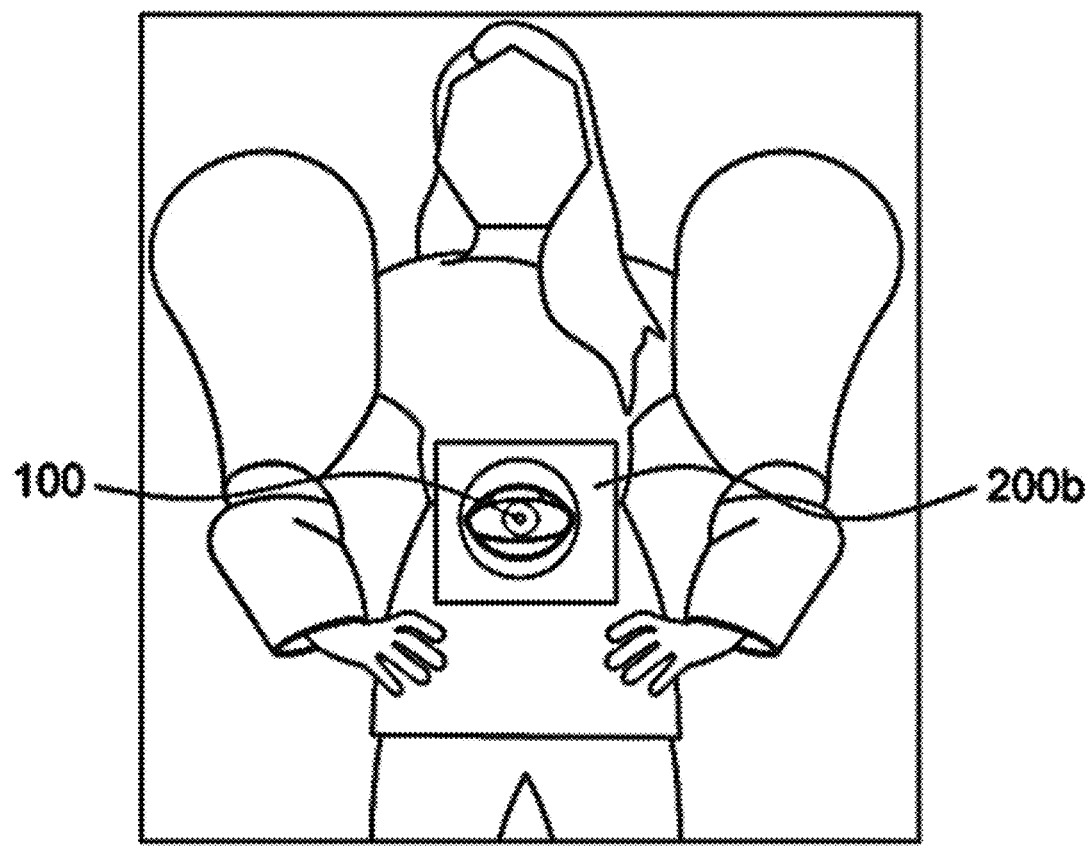
Figure 1C:
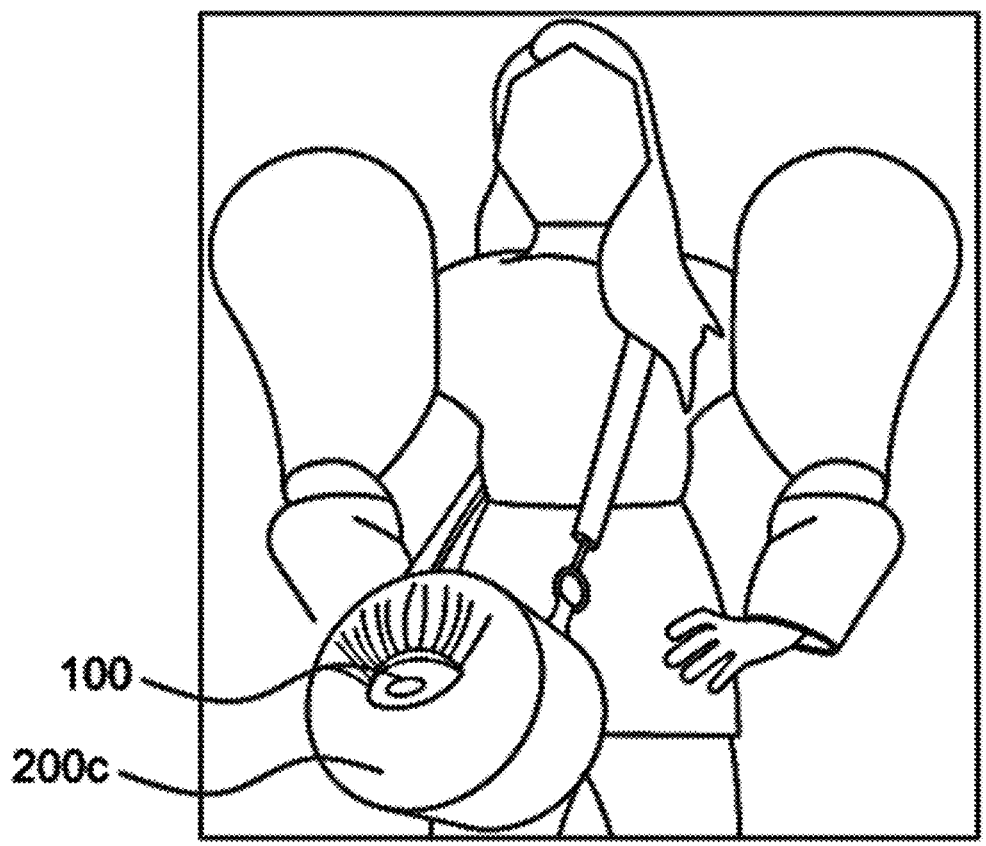
Figure 1D:
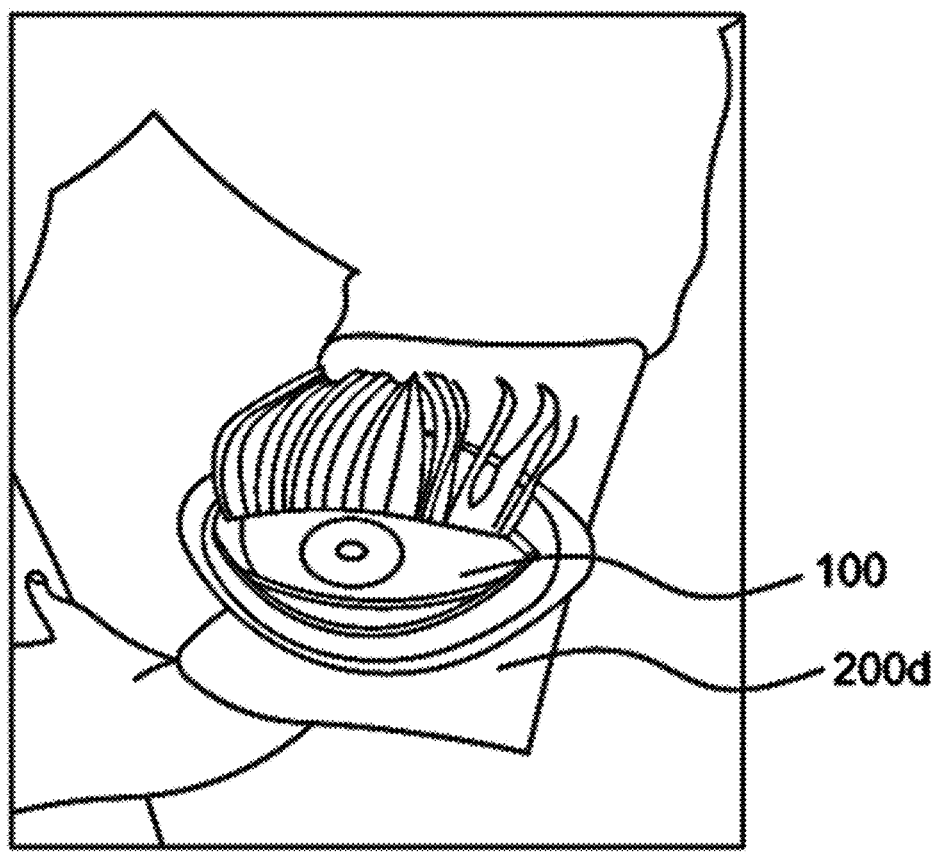

The present disclosure provides a three dimensional (3D) animatronic eye for fashion products. The 3D animatronic eye in the present disclosure displays effect of blinking eye lids and moving sclera in a horizontal and a vertical directions. The one or more fashion products comprises fabric, apparel, jewellery, accessories, carry bags and the like FIG. 1A-D illustrates various applications of exemplary 3D animatronic eye 100 for fashion products, in accordance with an embodiment of the present disclosure. In an embodiment, FIG. 1A-D depicts various systems comprising the 3D animatronic eye 100. FIG. 1A illustrates the 3D animatronic eye 100 attached on a t-shirt 200a. Here, the t-shirt 200a is an exemplary fashion product. FIG. 1B illustrates the 3D animatronic eye 100 attached at an upper front portion of a dress 200b. The dress 200b is an exemplary fashion product. FIG. 1C illustrates the 3D animatronic eye 100 attached on a bag 200c. The bag 200c is an exemplary fashion product. FIG. 1D illustrates the 3D animatronic eye 100 attached on a sleeve 200d of a dress. Similar to implementation as depicted in FIG. 1A-D, in various exemplary embodiments, the 3D animatronic eye 100 is attached to one or more products such as dresses, jackets, pants, handbags, shoes, children's toys, animated toys, school bags, lunch boxes, standalone tabletops, and the like to act as stress buster as well as fashion trend. The 3D animatronic eye 100 disclosed is in detachable form on any surface. The 3D animatronic eye 100 is attached or detached from the clothing or accessories as per user convenience. The 3D animatronic eye 100 comprises Velcro, lacing and any other similar arrangements to get attached or detached at various location on clothing and accessories.

Figure 2:
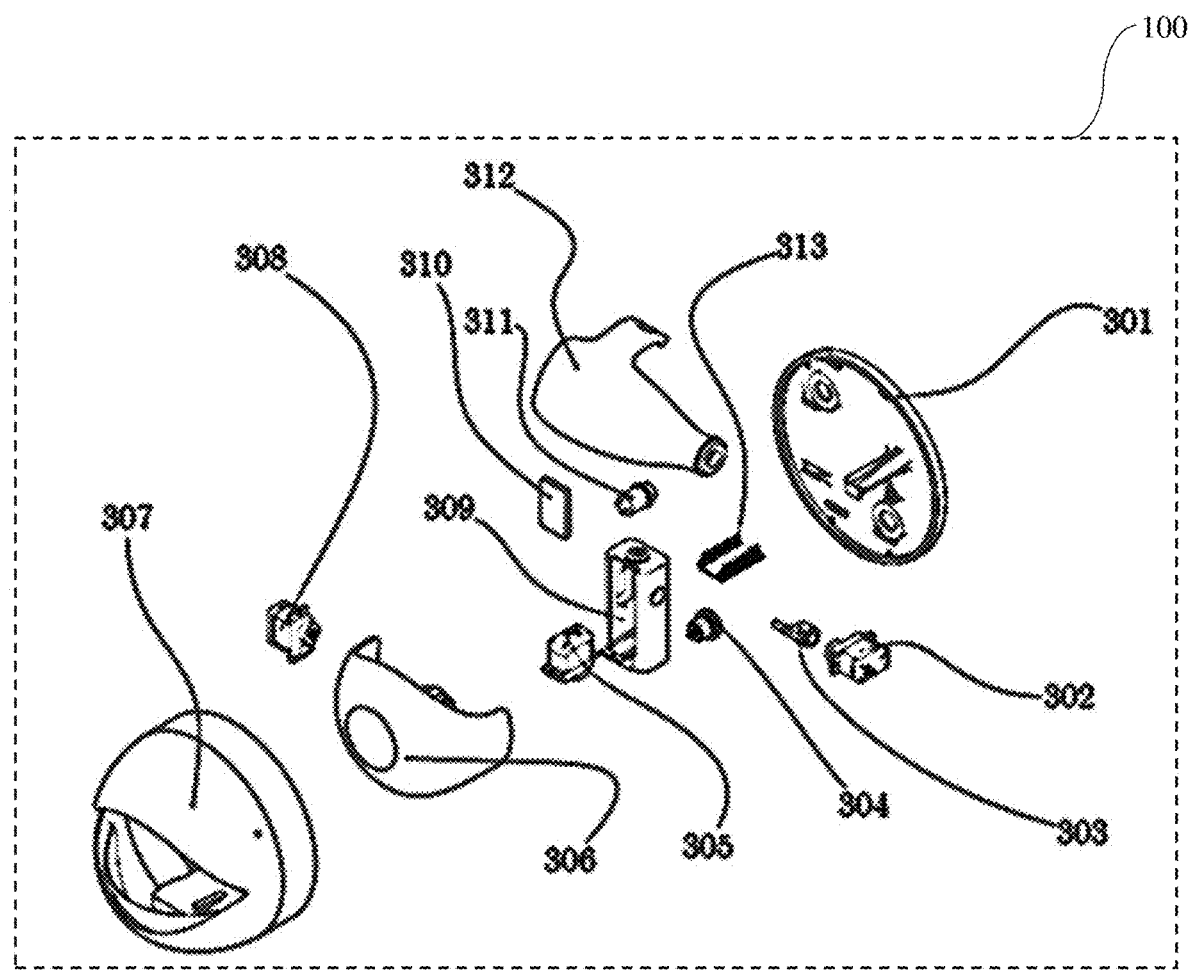
FIG. 2 illustrates an exemplary exploded view of the 3D animatronic eye, in accordance with the embodiment of the present disclosure.

FIG. 2 illustrates an exemplary exploded view of an 3D animatronic eye 100, in accordance with the embodiment of the present disclosure. The 3D animatronic eye 100 comprises an eye base 301, an internal connecting rod 309, a lid motor 302, a lid arm 303, an eye lid 312, a sclera 306, a horizontal motor 305, a vertical motor 308, a housing 307, a battery 310, a power plug 311, a network interface 304 and a control unit 313.

The internal connecting rod 309 is disposed centrally within the 3D animatronic eye 100 and is mounted on the eye base 301. The lid motor 302 is mounted on the internal connecting rod 309. The lid motor 302 engages with a lid arm 303 to move the lid arm 303 in a predefined angular range. The eye lid 312 is mounted on the lid arm 303. When the lid arm 303 rotates in a predefined angular range, the motion of the lid arm 303 generates a blinking motion of the eye lid 312.

Figure 6:
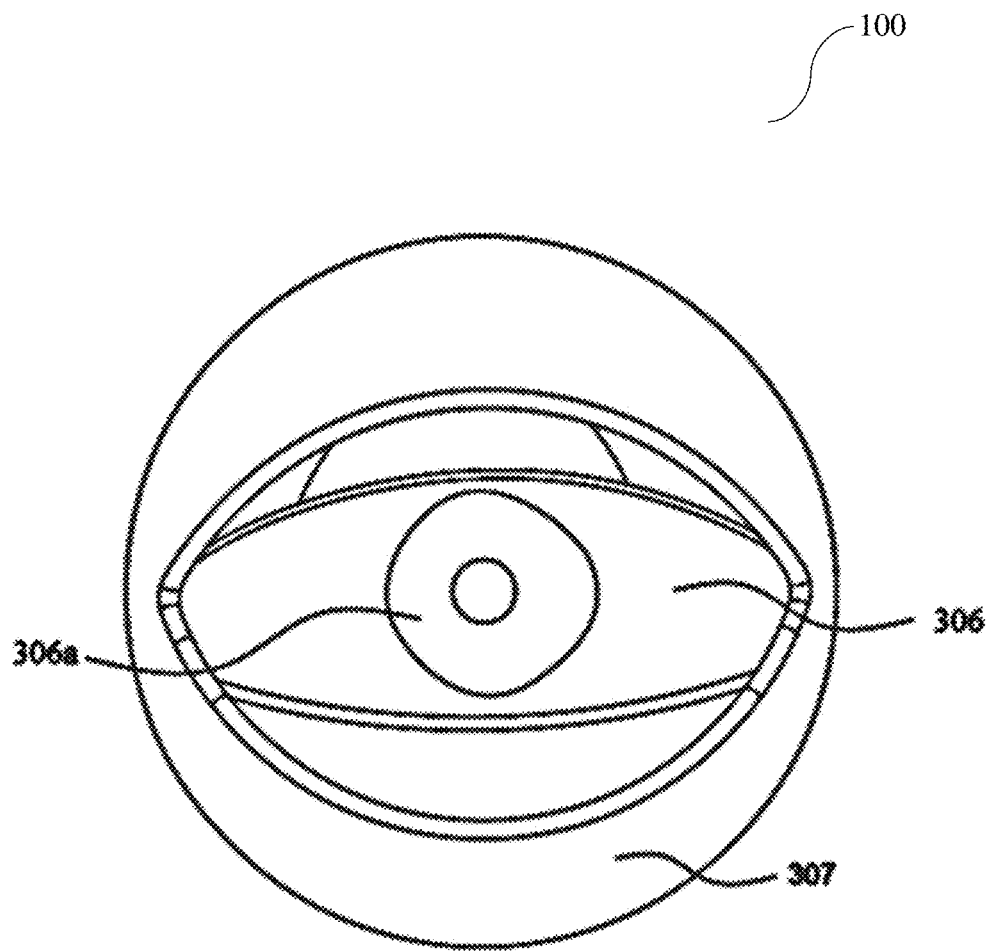
FIG. 6 illustrates a pupil print of the 3D animatronic eye, in accordance with the embodiment of the present disclosure.

The sclera 306 comprises a pupil print 306a [as shown in FIG. 6]. In an exemplary embodiment, the pupil print 306a comprises a camera electronically connected with the control unit 313 to capture picture or video of an area in front of the camera. The 3D animatronic eye 100 comprise a network interface 304 to store the picture or video captured by the camera on a remote server (not shown).

The horizontal motor 305 is mounted on the internal connecting rod 309 and engages with the sclera 306 to move the sclera 306. The sclera moves linearly in a left direction and a right direction as per an executable program instruction selected by a user. Further, in an embodiment the sclera remains in a central position as per an executable program instruction selected by a user. The vertical motor 308 is mounted on the internal connecting rod 309 and engages with the sclera 306 to move the sclera 306 linearly in an upward direction and a downward direction.

Figure 7:
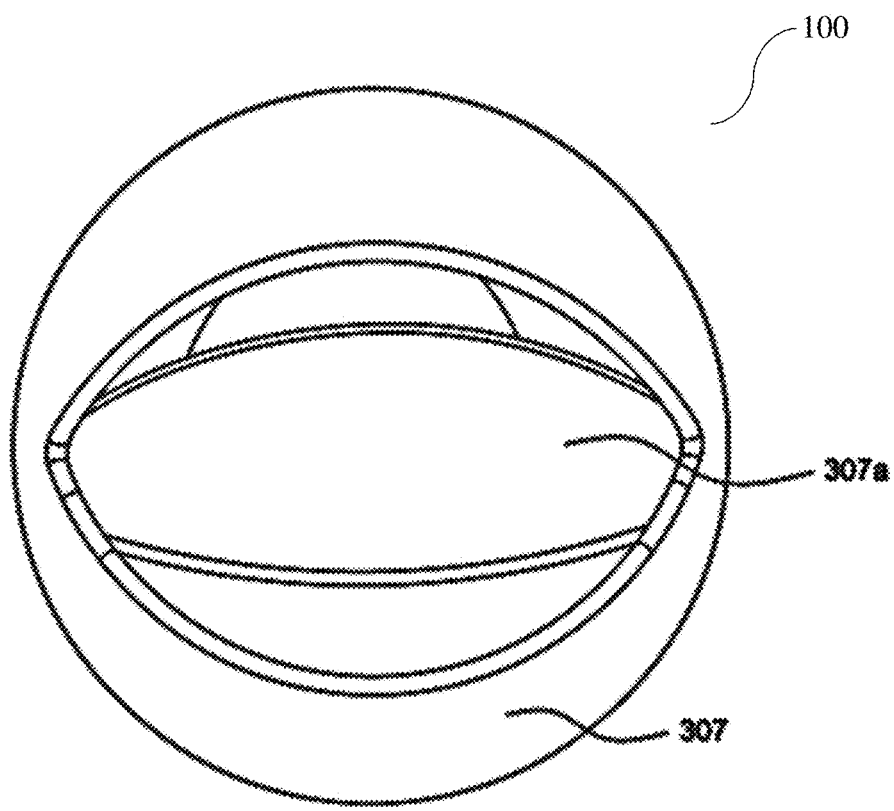
FIG. 7 illustrates a front view of a housing of the 3D animatronic eye, in accordance with the embodiment of the present disclosure.

The housing 307 mounted on the eye base 301 covers the sclera 306. The housing 307 comprises an eye shape opening 307a [as shown in FIG. 7]. The lid arm 303 rotates in both a clockwise and an anti-clockwise direction within the predefined angular range, wherein the range is anywhere from 0 degrees to 270 degrees, generating a blinking motion of the eye lid 312 on the housing 307. Further, the blinking motion of the eye lid 312 is for predefined duration as per an executable program instruction selected by the user. The battery 310 supplies electric power for the operation of the 3D animatronic eye 100 through the power plug 311. The network interface 304 wirelessly connects the 3D animatronic eye 100 with an external user device. The external user device may include mobile phone, smart phone, tablet, laptop, wearable device, and the like. The one or more user device or external user device interact with the 3D animatronic eye 100 for tracking and monitoring environment around user having the 3D animatronic eye 100. The one or more user devices capture images of the environment around the user upon receiving a trigger signal from the 3D animatronic eye 100.

The executable program instruction for one or more movements of the eye lid 312 and the moving sclera 306 are programmed for specific times and speeds.

The control unit 313 is mounted on the eye base 301 and electronically connected to the lid motor 302, the horizontal motor 305, and the vertical motor 308 to control the motion of the lid motor 302, the horizontal motor 305, and the vertical motor 308. In an exemplary embodiment, the control unit 313 is Arduino microchip. The control unit 313 comprises one or more executable program instructions to control the motion of the lid motor 302, the horizontal motor 305, and the vertical motor 308. Each of the one or more executable program instruction comprise a predefined motion pattern based on one or more parameters including a directional orientation of the fashion product, a movement of the fashion product, predefined duration of blinking, and the like.

The 3D animatronic eye 100 is detachable from mounted surface.

Figure 3:
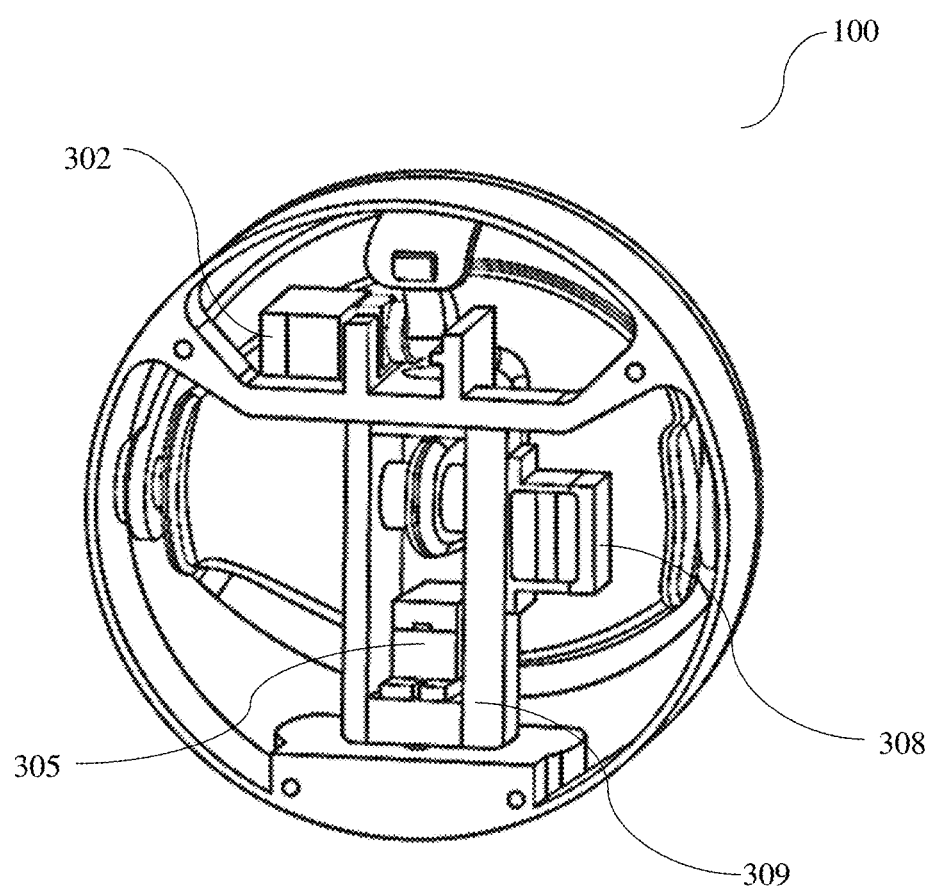
FIG. 3 illustrates a back side view of the 3D animatronic eye comprising mounting of one or more motors on an internal connecting rod disposed in the 3D animatronic eye, in accordance with the embodiment of the present disclosure.
Figure 4:
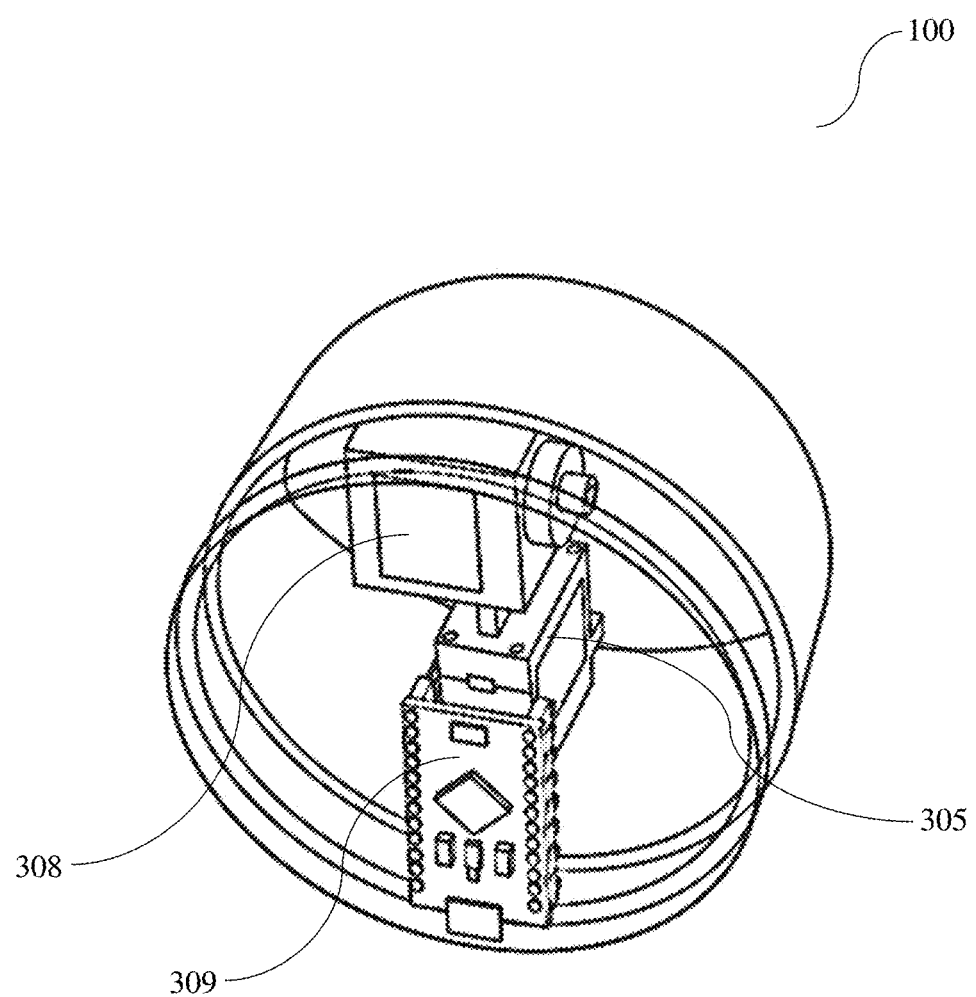
FIG. 4 illustrates a top view of the 3D animatronic eye comprising mounting of the one or more motors on the internal connecting rod disposed in the 3D animatronic eye for sclera movement, in accordance with the embodiment of the present disclosure.

FIG. 3 illustrates a back side view of the 3D animatronic eye comprising mounting of one or more motors on an internal connecting rod disposed in the 3D animatronic eye, in accordance with the embodiment of the present disclosure. The one or more motors comprises the lid motor 302, the horizontal motor 305, and the vertical motor 308. The lid motor 302, the horizontal motor 305, and the vertical motor 308 are mounted on the internal connecting rod 309. In an exemplary embodiment, the lid motor 302, the horizontal motor 305, and the vertical motor 308 are servo motors. Further, in an exemplary embodiment, additional motors are mounted on the internal connecting rod 309 to add one or more features to the motion of the sclera 306 and the eye lid 312. The motion of the lid motor 302, the horizontal motor 305, and the vertical motor 308 are programmed for specific time period and speed FIG. 4 illustrates a top view of the 3D animatronic eye comprising mounting of the one or more motors on the internal connecting rod disposed in the 3D animatronic eye for sclera movement, in accordance with the embodiment of the present disclosure. FIG. 4 depicts mounting of the horizontal motor 305, the vertical motor 308 and the control unit 313 on the internal connecting rod 309.

Figure 5:
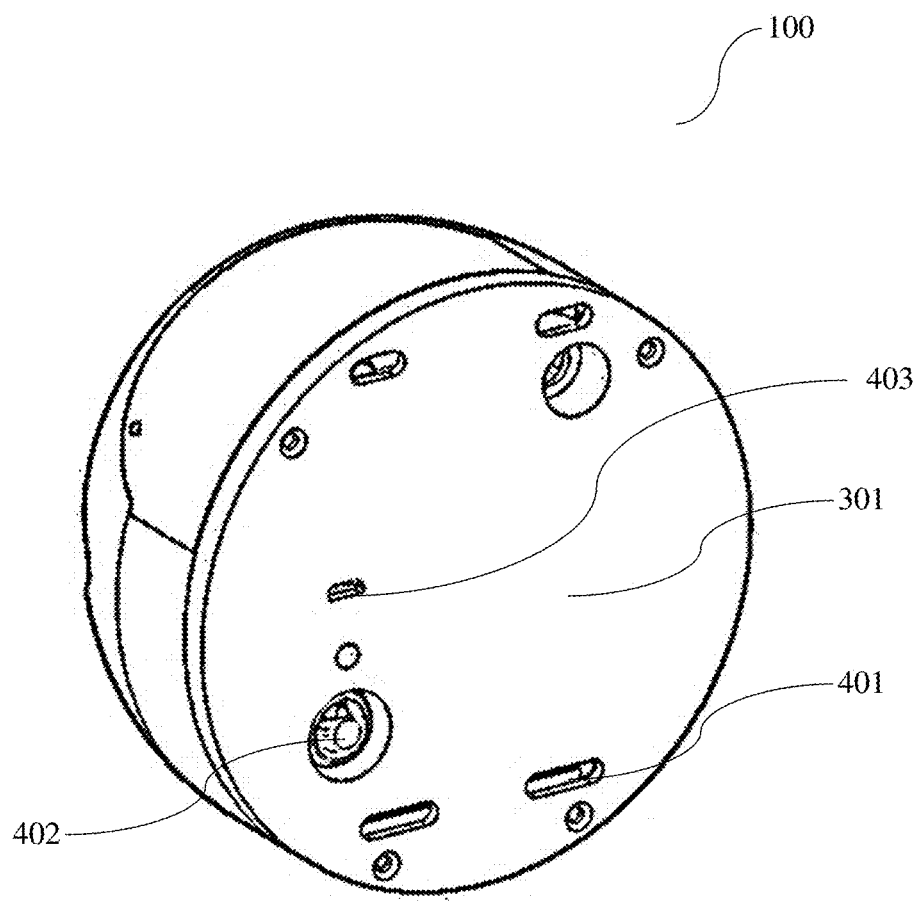
FIG. 5 illustrates an eye base of the 3D animatronic eye comprising a user interface, in accordance with the embodiment of the present disclosure.

FIG. 5 illustrates an eye base 301 of the 3D animatronic eye 100 comprising a user interface, in accordance with the embodiment of the present disclosure. The user interface at the eye base 301 comprises one or more mode selector buttons to select a predefined motion pattern of the eye lid 312 and the sclera 306 by controlling the motion of the lid motor 302, the horizontal motor 305, and the vertical motor 308. A combination of motion of the lid motor 302, the horizontal motor 305, and the vertical motor 308 generates a predefined motion pattern of the eye lid 312 and the sclera 306.

The user interface comprises a power switch 402 [shown in FIG. 2] to turn on or off the 3D animatronic eye 100. The user interface also comprises a charging socket 401 to connect to a battery charger for charging the battery 310 [shown in FIG. 2] mounted within the 3D animatronic eye 100 for power supply. In an exemplary embodiment, the charging socket 401 is a micro-universal serial bus (USB) port. Further, the user interface comprises a LED colour indicator 403 to indicate a real-time level of battery 310 charged.

FIG. 6 illustrates a pupil print of the 3D animatronic eye, in accordance with the embodiment of the present disclosure. In an exemplary embodiment a camera is disposed in the pupil print to capture images and videos of vision field of the camera.

FIG. 7 illustrates a front view of a housing of the 3D animatronic eye, in accordance with the embodiment of the present disclosure. The housing of the 3D animatronic comprises an eye shape opening 307a.

Figure 8A:
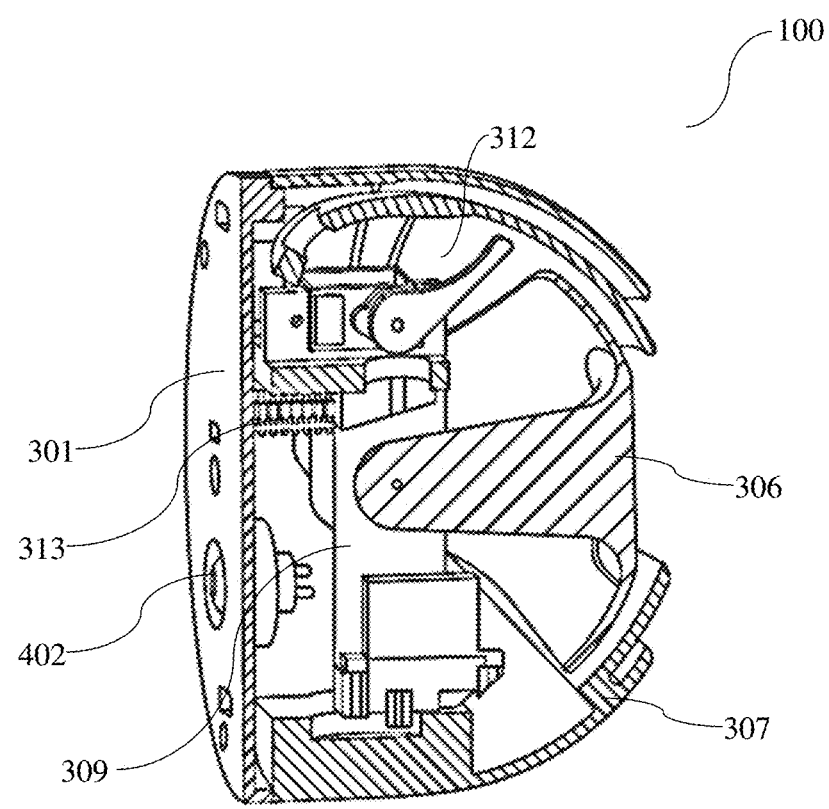
FIG. 8A-B illustrates a cross sectional view of the 3D animatronic eye, in accordance with the embodiment of the present disclosure.
Figure 8B:
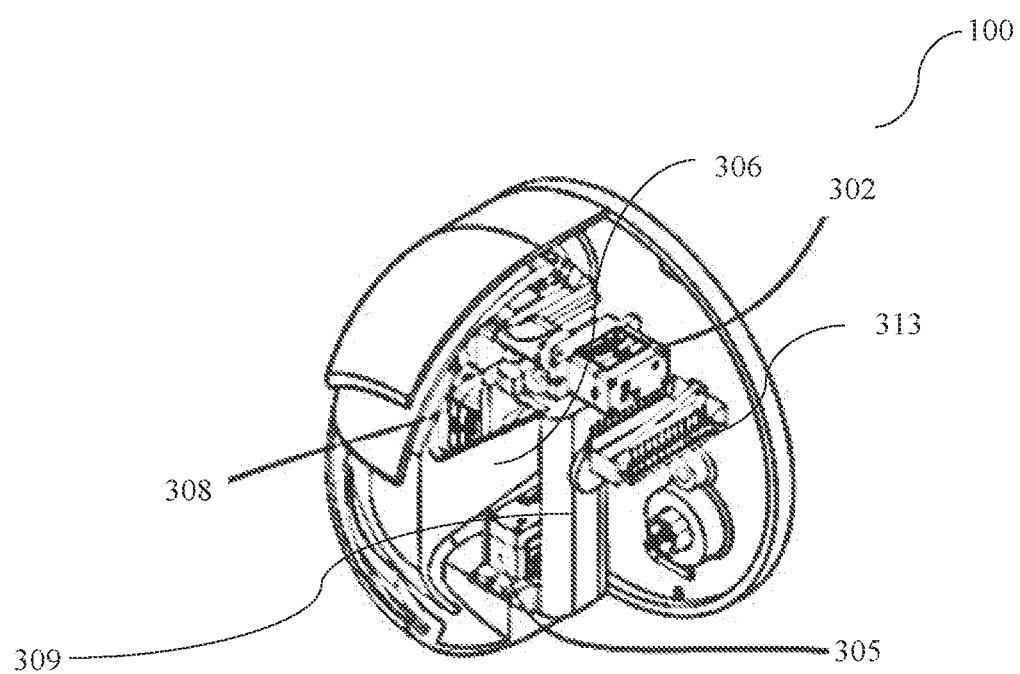

FIG. 8A-B illustrates a cross sectional view of the 3D animatronic eye, in accordance with the embodiment of the present disclosure. FIG. 8A-B indicate the internal connecting rod 309 disposed centrally within the 3D animatronic eye 100 and the lid motor 302, the horizontal motor 305, and the vertical motor 308 mounted on the internal connecting rod 309. Further, the control unit 313 disposed on the eye base 301 is depicted. Furthermore, a cross section of the user interface on the eye base 301 is shown in FIG. 8A, which includes the power switch 402.

Therefore, various embodiments of the present disclosure provide a technical solution of 3D animatronic eye 100 creating movement on fashion products to capture instant attention and to act as stress buster. Further, as the 3D animatronic eye 100 is detachable, it is versatile in use and easily placed on different fashion materials for different fashion appearances.

In existing arts, though animatronic eyes are available, they are highly expensive and robotic in appearance, rather than a fashion element. In such existing arts, connecting rods are outside the eye housing to achieve the blink function and are visible. On the other hand, in the present disclosure, the connecting rods are within the housing of the 3D animatronic eye, giving more of a realistic appearance and making a simpler design. Further, the components and assembly of the 3D animatronic eye of the present disclosure are simple and of low cost.

Furthermore, the 3D animatronic eye 100 includes a camera (not shown) in an exemplary embodiment to capture images and videos of an area in front of camera, i.e., vision field of camera. The camera enables to get view of areas not directly visible by the user. The 3D animatronic eye 100 with camera provides the user with an ability to capture image and videos and serves as safety tool for women or first responders under danger to capture images or videos of areas not directly visible to them. For example, a woman wearing the 3D animatronic eye 100 on her back is enabled to capture image of someone stalking her with her smart device remotely connected to the 3D animatronic eye 100, without turning around to look. The 3D animatronic eye 100 with camera offers similar application for cops for investigation purpose.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

The invention claimed is:

1. A three dimensional (3D) animatronic eye for fashion products, comprises:
   an eye base;
   an internal connecting rod mounted on the eye base, wherein the internal connecting rod is disposed centrally within the 3D animatronic eye;
   a lid motor mounted on the internal connecting rod and engaged with a lid arm to move the lid arm in a predefined angular range;
   an eye lid mounted on the lid arm, wherein motion of the lid arm generates a blinking motion of the eye lid;
   a sclera comprising a pupil print;
   a horizontal motor mounted on the internal connecting rod and engaged with the sclera to move the sclera linearly in a left direction and a right direction;
   a vertical motor mounted on the internal connecting rod and engaged with the sclera to move the sclera linearly in an upward direction and a downward direction;
   a housing mounted on the eye base covering the sclera, comprising an eye shape opening; and
   a control unit mounted on the eye base and electronically connected to the lid motor, the horizontal motor, and the vertical motor to control the motion of the lid motor, the horizontal motor, and the vertical motor,
     wherein the control unit comprises one or more executable program instructions to control the motion of the lid motor, the horizontal motor, and the vertical motor.

2. The 3D animatronic eye of claim 1, wherein the 3D animatronic eye comprises a user interface on the eye base comprising one or more mode selector buttons to select a predefined motion pattern of the eye lid and the sclera by controlling the motion of the lid motor, the horizontal motor, and the vertical motor.

3. The 3D animatronic eye of claim 2, wherein the user interface comprises a power switch to switch on or switch off the 3D animatronic eye.

4. The 3D animatronic eye of claim 2, wherein the user interface comprises a charging socket to connect to a battery charger for charging a battery mounted within the 3D animatronic eye socket for power supply.

5. The 3D animatronic eye of claim 1, wherein the user interface comprises an LED colour indicator to indicate a real-time level of battery charged.

6. The 3D animatronic eye of claim 1, wherein the pupil print comprises a camera electronically connected with the control unit to capture picture or video.

7. The 3D animatronic eye of claim 6, wherein the 3D animatronic eye comprise a network interface to store the picture or video captured by the camera on a remote server.

8. The 3D animatronic eye of claim 1, wherein the 3D animatronic eye is detachable from mounted surface.

9. The 3D animatronic eye of claim 1, wherein the motion of the lid motor, the horizontal motor, and the vertical motor are programmed for specific time period and speed.

10. A system for fashion products comprising:
    one or more fashion products;
    one or more user devices communicatively coupled to a three dimensional animatronic eye via a network; and
    the three dimensional animatronic eye mounted on the one or more fashion products and communicatively coupled to the one or more user devices via the network, wherein the three dimensional animatronic eye comprises:
    an eye base;
    an internal connecting rod mounted on the eye base, wherein the internal connecting rod is disposed centrally within the 3D animatronic eye;
    a lid motor mounted on the internal connecting rod and engaged with a lid arm to move the lid arm in a predefined angular range;
    an eye lid mounted on the lid arm, wherein motion of the lid arm generates a blinking motion of the eye lid;
    a sclera comprising a pupil print;
    a horizontal motor mounted on the internal connecting rod and engaged with the sclera to move the sclera linearly in a left direction and a right direction;
    a vertical motor mounted on the internal connecting rod and engaged with the sclera to move the sclera linearly in an upward direction and a downward direction;
    a housing mounted on the eye base covering the sclera, comprising an eye shape opening; and
    a control unit mounted on the eye base and electronically connected to the lid motor, the horizontal motor, and the vertical motor to control the motion of the lid motor, the horizontal motor, and the vertical motor,
    wherein the control unit comprises one or more executable program instructions to control the motion of the lid motor, the horizontal motor, and the vertical motor.

11. The system of claim 10, wherein the one or more fashion products comprises fabric, apparel, jewellery, accessories, carry bags and the like.

12. The system of claim 10, wherein the one or more user devices comprises a mobile phone, smart phone, tablet, laptop, wearable device, and the like.

13. The system of claim 10, wherein the one or more user devices interact with the three dimensional animatronic eye for tracking and monitoring environment around user having the three dimensional animatronic eye.

14. The system of claim 13, wherein the one or more user devices capture images of the environment around the user upon receiving a trigger signal from the three dimensional animatronic eye.

* * * * *